United States Patent [19]

Kamiyama et al.

[11] Patent Number: 4,795,924
[45] Date of Patent: Jan. 3, 1989

[54] MAGNETO BOWL-SHAPED ROTOR

[75] Inventors: Akira Kamiyama, Gunma; Tokio Maki, Kiryu, both of Japan

[73] Assignee: Mitsuba Electric Manufacturing Co. Ltd., Gunma, Japan

[21] Appl. No.: 100,105

[22] Filed: Sep. 23, 1987

[30] Foreign Application Priority Data

Sep. 24, 1986 [JP] Japan ................... 61-225337

[51] Int. Cl.⁴ .................... H02K 5/04; H02K 21/22
[52] U.S. Cl. ..................... 310/67 R; 310/42; 310/153
[58] Field of Search ........... 29/509, 522; 310/42, 310/67 R, 153, 268, 91, 254

[56] References Cited

U.S. PATENT DOCUMENTS

| 3,734,697 | 5/1973 | Sieghartner | 29/509 |
| 4,306,167 | 12/1981 | Tomite et al. | 310/42 |
| 4,603,271 | 7/1986 | Maruyama et al. | 310/42 |
| 4,647,803 | 3/1987 | von der Heide et al. | 310/67 R |

FOREIGN PATENT DOCUMENTS 61-88750  5/1986  Japan ................... 310/153

Primary Examiner—Peter S. Wong
Assistant Examiner—D. L. Rebsch
Attorney, Agent, or Firm—Rodman & Rodman

[57] ABSTRACT

A rotor in a magnetogenerator, having a boss member coupled onto a rotary shaft of an engine and a yoke jointed to a flange on the outer periphery of this boss member. A serration provided at one end thereof with a collar portion is formed on the outer periphery of the flange of the boss member. Another serration is formed on the inner peripheral surface of an opening formed in the bottom wall of the yoke, and both serrations are serration-jointed to each other by clinchingly finishing an end portion of the flange received in a recess formed at an end face of the opening in the yoke, whereby the brim, or lip, portion of the opening in the yoke is clamped between the collar portion and the clinchingly finished portion. The collar portion of the boss member, thus serration-jointed, is received in the recess formed around the brim portion of the opening in the yoke, to prevent the collar portion from protruding to the outside from the bottom wall surface of the yoke in the axial direction.

4 Claims, 3 Drawing Sheets

MAGNETO BOWL-SHAPED ROTOR

BACKGROUND OF THE INVENTION

1. Field of the Invention

This invention relates to a rotor for a magnetogenerator and a process of manufacturing the same, and more particularly to improvements in a construction for joining a yoke to a boss member. The invention is effectively utilized in manufacturing a rotor in a magnetogenerator for small-sized vehicles including motorcycles, outboard motors or portable generators.

2. Related Art Statement

In general, a magnetogenerator comprises: a rotor, in which a plurality of magnets are provided at regular intervals on the inner peripheral surface of a generally bowl-shaped yoke; and an armature, in which a plurality of coil units are provided at regular intervals in yoke of the rotor; wherein the armature is fixed to an outer shell of an engine, and the rotor is coupled onto a rotary shaft of the engine.

The magnetogenerator of the type described is constructed such that, in the rotor, the boss member thereof coaxially connected to the bottom wall of the yoke is fixed to the rotary shaft of the engine, whereby the rotor is linked with the engine. An example of the construction for coaxially connecting the boss member to the bottom wall of the yoke, is a rotor in a magnetogenerator described in Japanese Utility Model Laid-Open No. 60-11662, for example.

More specifically, as shown in FIG. 6, in the rotor of this magnetogenerator, a boss member 1 protruding thereon is provided with a small-diameter flange 2, and a serration 3 is formed at one side of the flange 2. The boss member 1 is coupled such that the boss member can be serration-jointed to an opening 5 of the yoke 4 and the flange 2 can be in abutting contact with the brim, or lip, around the opening 5. Further, a clinched finished portion 6 is formed at the other end of the flange 2 of the serration 3 of the boss member 1 such that the finished portion 6 can clamp the brim around the opening 5 of the yoke 4 between the portion 6 and the flange 2, thus fixedly joining the boss member 1 to the yoke 4.

With the rotor in the magnetogenerator having the above-described construction, since the flange 2 protrudes to the outside from the bottom wall of the yoke 4, there are presented the disadvantages that the size of the rotor in the axial direction is increased and it is difficult to increase the mechanical strength of the rotor against torque.

SUMMARY OF THE INVENTION

An object of the present invention is to provide a rotor capable of controlled size in the axial direction and increased mechanical strength against torque, and a process of manufacturing the same.

The rotor in a magnetogenerator according to the present invention includes a boss member having an outer peripheral flange. The boss member is coupled onto a rotary shaft and is partially inserted and fixed into an opening formed in the bottom wall of a generally bowl-shaped yoke. A serration provided at one end of the includes a collar portion formed on the outer periphery of the flange of the boss member. This serration of the boss member is coupled into the opening of the yoke, such that the collar portion is brought into abutting contact with a recess formed on an end face of the opening of the yoke. The boss member is thus sunk into the recess of the yoke member and the other end of the boss member flange is clinched to form a finished pattern, whereby the yoke is clamped between the collar portion and the clinched finished portion.

According to the present invention, the serration is formed on the flange of the boss member, whereby the outer diameter of the flange can be set at a large value, so that the mechanical strength against the torque in the serration-joint can be increased. Furthermore, the collar portion opposed to the clinched finished portion, which is needed for clamping the yoke, is received in the recess formed around the brim portion of the opening of the yoke where the boss member is joined with the yoke. Thus the collar portion does not project from the bottom wall of the yoke. Accordingly, the size in the axial direction of the rotor of the magnetogenerator can be reduced by the amount of the collar portion which would ordinarily project.

Additionally, the aforesaid and other objects, and advantages of the present invention will become apparent more fully from the following detailed description in conjunction with the accompanying drawings.

DETAILED DESCRIPTION OF THE PREFERRED EMBODIMENT

Figure 1:
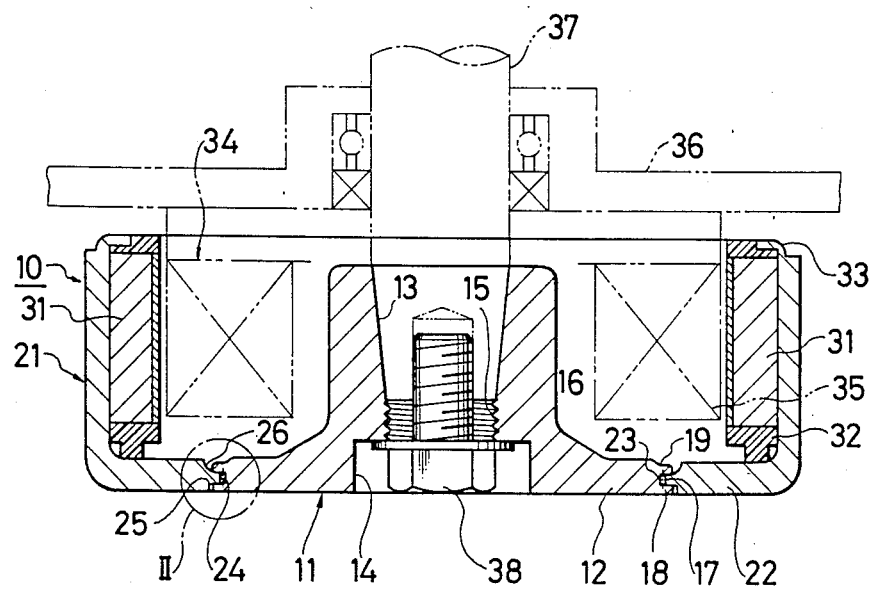
FIG. 1 is a longitudinal sectional view showing one embodiment of the rotor is for a magnetogenerator according to the present invention.
Figure 3:
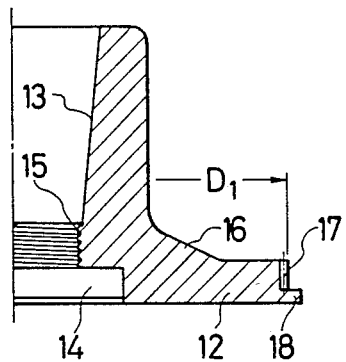
FIGS. 3, 4 and 5 are partially enlarged longitudinal, sectional views respectively showing one example of the process of manufacturing the rotor of the magnetogenerator shown in FIG. 1.
Figure 4:
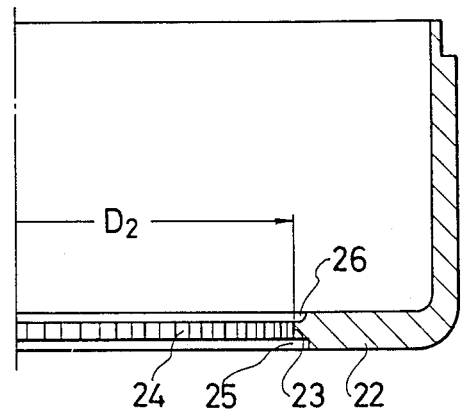

Referring now to the drawings, in the embodiment shown in FIG. 1, the rotor 10 is provided with a boss member 11, to which a rotary shaft 37 is coupled, and a yoke 21 is fixed to the boss member 11. The boss member 11 and the yoke 21 are formed as shown in FIGS. 3 and 4.

First, the boss member 11 is integrally formed into a generally cylindrical shape by cold forging, and provided with a flange 12 annularly formed on the outer periphery at one end portion of the boss member 11. In a tubular hollow portion of the boss member 11, a tapered inner peripheral surface 13 to be coupled to a tapered outer peripheral surface of the rotary shaft 37 is formed to progressively decrease in diameter towards the flange 12. A recess 14 for a mounting clamp bolt 38 is formed at an end portion of the tubular hollow portion on an underside of the flange 12, as shown in FIG. 1. A threaded portion 15 for the rotary shaft 37 into the boss member 11 is formed on a bolt seat surface. An inclined surface portion 16 is formed on the outer periphery of the boss member 11 in such a manner as to be able to evade stress concentration.

An outer diameter $D_1$ (FIG. 3) of the flange 12 of the boss member 11 is set at a relatively large value, e.g. about ½ or thereabove of the inner diameter of the yoke 21, which will be described hereunder. A serration 17 is simultaneously formed by cold forging on the outer periphery of the flange 11. Furthermore, a collar portion 18 is provided on an end face of the serration 17, on the opposite side of the tubular portion in a manner to be projected to a height higher than the serration 17. The collar portion 18 is also formed by cold forging.

On the other hand, the yoke 21 is integrally formed into a generally round bowl shape by press work. Concentrically formed in a bottom wall 22 of this yoke 21 is an opening 23. An inner diameter $D_2$ (FIG. 4) of opening 23 is set at a size into which the serration 17 of the flange 12 can be coupled with an allowance for press fit. A serration 24 is simultaneously formed on the inner periphery of the opening 23 by press work. Formed at opposite end faces of the brim of the opening 23 are a recess 25 on the outer side and another recess 26 on the inner side, respectively. The recesses 25 and 26 are each formed in a ring shape having predetermined width and depth, and are each integrally formed by press work. The recess 25 on the outer side of the opening 23 is adapted to receive the collar portion 18 of the boss member 11, and the recess 26 on the inner side is adapted to receive a clinched finished portion 19 to be described hereunder.

Figure 5:
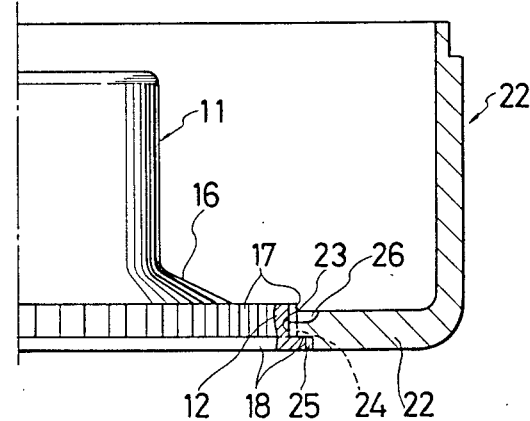
Figure 6:
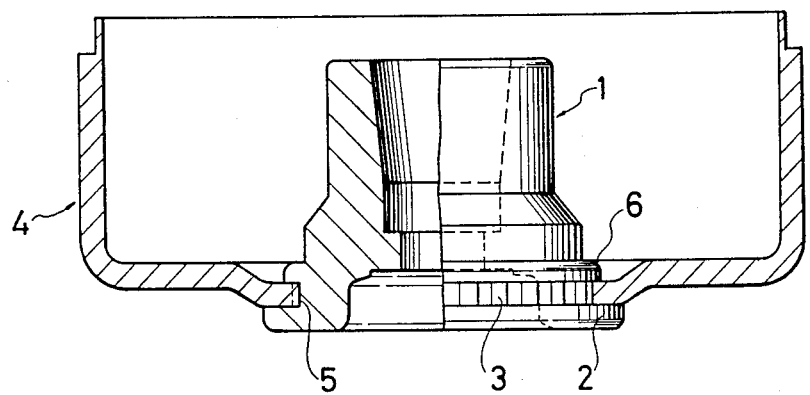
FIG. 6 is a longitudinal sectional view showing the prior art.

As shown in FIGS. 1 and 5, the boss member 11 and the yoke 21 are integrally assembled to each other.

Referring to FIG. 5, the boss member 11 is assembled to the yoke 21 such that the flange 12 thereof is pressed into the opening 23 from the outer side of the bottom wall 22 of the yoke 21 until the collar portion 18 abuts the base surface of the recess 25. At this time, the inner diameter $D_2$ of the opening 23 is of a magnitude that is equal to or less than the magnitude of the outer diameter $D_1$ of the flange 12. Thus the serration 17 and the serration 24 are complementarily matched to be snugly coupled to each other, so that the flanges 12 of the boss member 11 and the bottom wall 22 of the yoke 21 can be reliably and firmly serration-jointed to each other through the serrations 17 and 24. This serration joint is not realized in a groove shape where the opposite ends of the serration 17 are blocked. However, it is realized when the serration 17 is blocked at one end by the collar portion 18, but opened at the other end.

Figure 2:
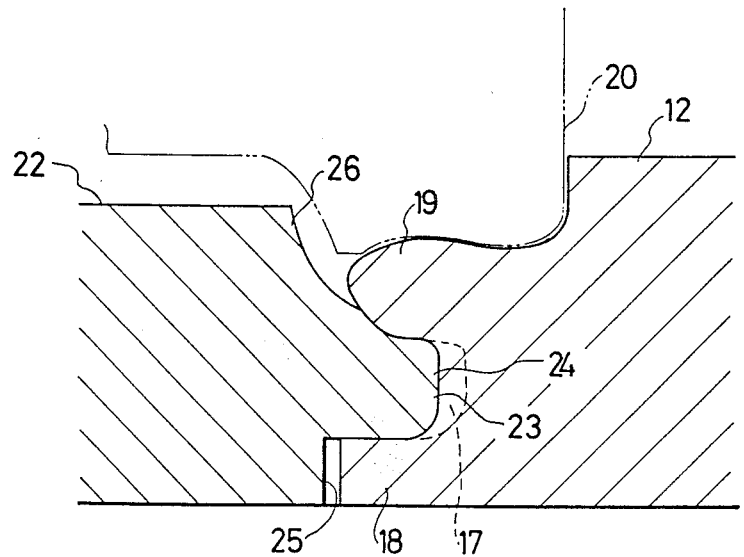
FIG. 2 is a partially enlarged sectional view showing a section II in FIG. 1.

Subsequently, by use of a metallic die 20 indicated by a phantom line in FIG. 2, in the flange 12 of the boss member 11, is clinched to form the finished portion 19 such that an end portion of the serration 17 on the side opposite to the collar portion 18 is subjected to press work. Under this arrangement the brim portion around the opening 23 of the bottom wall 22 of the yoke 21 is formed into an annular shape pressed by the clinched finished portion 19. As shown in FIG. 1, the brim portion of the opening 23 of the bottom wall 22 of the yoke 21 is sandwiched between the clinched finished portion 19 and the collar portion 18, to thereby be firmly grasped. Furthermore, along with this clinched finishing, the serration 17 is deformed radially and outwardly, so that the serration joint has more reliability and tightness.

Referring to FIG. 1, plurality of magnets 31 are arranged at predetermined positions on the inner peripheral surface of the side wall of the yoke 21, the magnets 31 being housed in casings 32 made of synthetic resin, pressed into the yoke 21, and fixed in positions by suitable means such as the annular clinched portion 33. An armature 34 includes coil units 35 constituting the armature 34, an engine outer shell 36, to which the armature 34 is fixed, an engine rotary shaft 37, and a bolt 38 for fastening the rotor 10 to the rotary shaft 37.

In the rotor of the magnetogenerator obtained by the above-described manufacturing process, the boss member 11 and the yoke 21 are locked against dislodging and rotating by the serrations 17 and 24 of the serration joint at the flange 12 and the clamping of the serration joint between the collar portion 18 and the clinched finished portion 19. In this state, the allowance for the serration-joint in the axial direction is small. However, the serration-joint portion is provided on the outer periphery of the large-diameter flange 12, whereby the allowance for the joint in the circumferential direction is considerably large, so that the mechanical strength against torque can be very strong.

Since both the serration 17 and the collar portion 18 are provided at the end portion on the outer periphery of the flange 12, the recess 25 on the outer side is provided around the brim of the opening 23 of the yoke 21, whereby the collar portion 18 can be prevented from protruding to the outside from the bottom wall 22 of the yoke. In effect, the joint portion between the boss member 11 and the yoke 21 is substantially coplanar.

The clinched finished portion 19 to clamp the brim portion around the opening 23 of the bottom wall 22 of the yoke 21 from above and below in cooperation with the collar portion 18 is formed with sufficient force to deform the outer peripheral edge portion of the flange 12 of the boss member 11, whereby the allowance for pressing becomes very long and the mechanical strength is considerably increased. The brim portion around the opening 23 of the bottom wall 22 of the yoke 11 is strongly pressed and grasped from above and below by both the collar portion 18 and the clinched finished portion 19, whereby the mechanical strength of the joint portion between the flange 12 of the boss member 11 and the bottom wall 22 of the yoke is considerably high.

Since the clinched finished portion 19 is received in the recess 26 on the inner side of the yoke 20 so as to not protrude into the yoke 21, the portion 19 does not interfere with the armature 34.

Further, in this embodiment, since the serrations 17 and 24 are formed at the times of the press work and the cold forging of the boss member 11 and the yoke 21, respectively, the serrations are formed such that the crests and roots are accurate and the depths are large as compared with the knurling work where the crests and roots are formed at the bottom portion of a groove on the surface of a member by use of a thread rolling tool, and a surface hardness becomes considerably high, thus resulting in increased mechanical strength of the serration-joint portion. Moreover, since the serrations can be simultaneously formed at the times of working on the boss member 11 and the yoke 21, decrease in productivity due to the forming of the serrations can be controlled.

Furthermore, when the rotors different in outer diameter of the yoke 21 are needed depending on the types of engine, the size of the boss member 11 does not have to be changed, whereby the boss member 11 can be used commonly, so that decrease in productivity can be controlled.

The present invention need not necessarily be limited to the above embodiment, and, various modifications can be realized within the scope of not departing from the technical gist thereof.

For example, the serration finishings need not necessarily be formed on both the outer periphery of the flange of the boss member and the inner periphery of the opening of the bottom wall of the yoke, and the serration finishing may be applied only on the member made of the rigid material, i.e. the outer periphery of the flange of the boss member. In this case, when the serration on the outer periphery of the flange of the boss member is pressed into the opening formed at the yoke bottom wall where the suitable allowance for the press-in is formed, the serration bites into the inner peripheral wall of the opening of the yoke, whereby the serration is cuttingly formed on the inner peripheral wall of the opening, so that the flanges of the boss member and the opening on the yoke bottom wall can be serration-jointed.

As has been described hereinabove, according to the present invention, the serration is formed on the outer periphery of the flange of the boss member, whereby the outer diameter of the flange can be set set a large value, so that the mechanical strength against the torque in the serration-joint can be raised. Furthermore, the collar portion opposed to the clinched finished portion, which is necessary for clamping the yoke, is received in the recess provided around the brim portion of the opening of the yoke in the state where the boss member and the yoke are connected to each other, so that the collar portion can be prevented from protruding to the outside from the bottom wall of the yoke. Accordingly, the size of the rotor of the magnetogenerator in the axial direction can be reduced.

What is claimed:

1. A rotor in a magnetogenerator wherein a boss member includes an outer peripheral flange and is coupled onto a rotary shaft, the boss member being partially inserted and fixed into an opening formed in the bottom wall of a generally bowl-shaped yoke, the opening in the yoke having a brim portion with an axially outer side and an axially inner side characterized in that:

a first serration is formed on the outer periphery of said flange of said boss member, said first serration extending in an axial direction of the rotor, said boss member including a collar portion extending radially beyond the first serration on said flange, said first serration is coupled into the opening of said yoke, a first recess is formed in the axially outer side of the brim of the opening of the yoke and a second recess is formed in the axially inner side of said brim portion, said collar portion is brought into said first recess in abutting contact with said yoke and, said flange has an axially inner surface opposite said collar portion, said axially inner surface is clinched to form a finished portion that is received in the second recess provided on the axially inner side of the brim portion of the opening of the yoke, whereby the brim portion of the opening of said yoke is clamped between said collar portion and said clinched finished portion.

2. The rotor in a magnetogenerator as set forth in claim 1, wherein a second serration is formed on the inner pheripheral surface of the opening in the bottom wall of said yoke, and said first and second serrations are serration-joined to each other between said collar portion and said clinched finished portion.

3. The rotor in a magnetogenerator as set forth in claim 1, wherein an outer diameter of said flange of said boss member is equal to or greater than one-half the inner diameter of the opening in the yoke.

4. The rotor in a magnetogenerator as set forth in claim 1, wherein said boss member has an axially outer surface at the collar portion of said flange that is substantially coplanar with the bottom wall of said yoke when said brim portion is clamped between said collar portion and said clinched finished portion.

* * * * *

UNITED STATES PATENT AND TRADEMARK OFFICE
CERTIFICATE OF CORRECTION

PATENT NO.   :   4,795,924
DATED        :   January 3, 1989
INVENTOR(S)  :   Akira Kamiyama et al.

It is certified that error appears in the above-identified patent and that said Letters Patent is hereby corrected as shown below:

At column 1,
    line 46, change "since" to --wherein--.
    line 64, after "of the" insert boss member--.

At column 2,
    line 58, after "for" insert --threading--.

Signed and Sealed this

Sixth Day of June, 1989

Attest:

DONALD J. QUIGG

*Attesting Officer*

*Commissioner of Patents and Trademarks*